United States Patent
Freitas et al.

(10) Patent No.: US 10,081,235 B2
(45) Date of Patent: Sep. 25, 2018

(54) EXPANDABLE COVER ASSEMBLIES FOR CARGO COMPARTMENTS OF MOTOR VEHICLES

(71) Applicant: GM GLOBAL TECHNOLOGY OPERATIONS LLC, Detroit, MI (US)

(72) Inventors: Alexandre H. Freitas, Sao Paulo (BR); Eduardo Nakao, Santo Andre (BR); Renan Bichi, Sao Bernardo do Campo (BR)

(73) Assignee: GM Global Technology Operations LLC, Detroit, MI (US)

( * ) Notice: Subject to any disclaimer, the term of this patent is extended or adjusted under 35 U.S.C. 154(b) by 90 days.

(21) Appl. No.: 15/220,665

(22) Filed: Jul. 27, 2016

(65) Prior Publication Data
US 2018/0029454 A1    Feb. 1, 2018

(51) Int. Cl.
*B60J 7/10* (2006.01)
*B60P 7/08* (2006.01)

(52) U.S. Cl.
CPC ............ *B60J 7/102* (2013.01); *B60P 7/0876* (2013.01)

(58) Field of Classification Search
CPC ............................... B60J 7/102; B60P 7/0876
USPC .............. 296/100.15, 100.18, 100.16, 26.04; 410/97, 98, 100, 118
See application file for complete search history.

(56) References Cited

U.S. PATENT DOCUMENTS

| | | | | |
|---|---|---|---|---|
| 3,744,841 A * | 7/1973 | Schmidt | ..................... | B60P 3/34 296/26.04 |
| 4,739,528 A * | 4/1988 | Allen | ..................... | B60P 7/0876 296/100.15 |
| 4,832,359 A * | 5/1989 | Rafi-Zadeh | ............ | B60J 7/1614 150/166 |
| 4,848,828 A * | 7/1989 | Hunt | ........................ | B60P 7/04 150/154 |
| 5,851,047 A * | 12/1998 | Adams | ...................... | B60P 7/04 280/423.1 |
| 5,906,407 A | 5/1999 | Schmeichel | | |
| 6,293,608 B1 | 9/2001 | Dicke et al. | | |
| 6,527,318 B2 * | 3/2003 | Kolper | ...................... | B60P 7/04 293/116 |
| 7,318,618 B1 | 1/2008 | Yue | | |
| 8,973,969 B1 | 3/2015 | Potter | | |

(Continued)

*Primary Examiner* — Jason S Morrow
(74) *Attorney, Agent, or Firm* — Quinn IP Law

(57) ABSTRACT

Presented are expandable compartment cover assemblies for motor vehicles, methods for making and methods for using such cover assemblies, and motor vehicles with expandable tonneau cover assemblies. Presented, for example, is an expandable cover assembly for a motor vehicle with a cargo compartment. The expandable cover assembly includes a frame section that releasably attaches to the vehicle body, and extends across some or all of the cargo compartment. The frame section has a central aperture that extends therethrough. A canopy is seated within this central aperture and at least partially surrounded by the frame section. A flexible joint attaches the canopy to the frame section such that the canopy selectively transitions between a collapsed state, whereat the canopy is a first height from the compartment floor of the cargo compartment, and an expanded state, whereat the canopy is a second height, greater than the first height, from the compartment floor.

20 Claims, 2 Drawing Sheets

(56) References Cited

U.S. PATENT DOCUMENTS 9,061,572 B2 6/2015 Potter
2011/0241372 A1 10/2011 Kusu

\* cited by examiner

EXPANDABLE COVER ASSEMBLIES FOR CARGO COMPARTMENTS OF MOTOR VEHICLES

TECHNICAL FIELD

The present disclosure relates generally to compartment cover assemblies for motor vehicles. More specifically, aspects of this disclosure relate to movable tonneau covers for cargo beds of pickup trucks.

BACKGROUND

Most conventional motor vehicles, such as the modern-day automobile, are originally equipped with a dedicated storage area next to the passenger compartment for stowing personal effects and belongings. A traditional trunk compartment, for example, is a large storage bin located at the rear of the vehicle and covered by a trunk lid that is hinged underneath the passenger compartment's rear deck. By comparison, the dedicated storage area of a pickup truck and other cargo transport vehicles (e.g., sport utility vehicles (SUV), cargo vans, box trucks, etc.) is typified by a rear cargo compartment that is closed off at the tail end by a hinged liftgate, tailgate or door assembly. Truck cargo compartments normally offer more storage volume than their conventional trunk counterparts by providing increased floor space with an elevated cargo ceiling (vans, SUVs, box trucks, etc.) or an open cargo area without a ceiling (pickups, flatbeds, etc.).

Pickup trucks and other cargo transport vehicles are frequently used as commercial work vehicles because the increased storage volume of the rear cargo compartment provides extra space for hauling oversize equipment, tools and trade supplies. The rear cargo compartment may also be customized with storage boxes, shelving, or racks to accommodate more specific storage and hauling needs. For vehicles with an open cargo area, it has become common practice to employ a cargo bed cover (also known as a "tonneau cover") to protect stowed equipment, tools, and materials from theft and damage, and to prevent these objects from becoming inadvertently dislodged from the cargo bed during transport. Typically, these covers are either soft-top designs, which can be removed or folded, or hard-top designs, which are either planar, unitary constructions or are segmented to be juxtaposed in bi-fold or tri-fold type configurations.

SUMMARY

Disclosed herein are expandable compartment cover assemblies for motor vehicles, methods for making and methods for using such expandable compartment cover assemblies, and motor vehicles with rear cargo compartments covered by expandable tonneau covers. By way of example, and not limitation, an improved full-bed-length tonneau cover with a unique multi-height canopy is disclosed. A frame section of the cover partially or fully surrounds the canopy, and removably couples to the lateral sidewalls and, optionally, the forward endwall of a truck's rear cargo bed. Lateral and longitudinal edges (or a single peripheral edge of a cylindrical or hemispherical design) of the canopy are coupled via a flexible joint to the cover's frame section. This allows the canopy to expand upward, away from the bed floor, to a raised position and, thereafter, to collapse downward, towards the bed floor, to a lowered position. For some preferred designs, the canopy transitions between the raised and lowered position in a telescoping manner such that, when the canopy is collapsed, the top surface of the canopy sits flush with the frame section and the flexible joint sits below the frame section within the cargo bed's interior storage volume.

The canopy can be secured in the lowered position, for example, via a zipper or hook-and-loop flap that extends partially or continuously around a joining interface at which the canopy couples to the frame section. Conversely, an articulating skeletal armature or a removable scaffolding/stanchion arrangement can be provided to retain the canopy in the raised position. Other design options include fabricating the expandable tonneau cover assembly as a soft-top or hard-top configuration, a foldable or roll-up configuration, an automated or manual configuration, or any combination thereof. The primary constituent parts of the tonneau cover, individually or collectively, can be fabricated from a compliant (fabric) material or a rigid (polymeric or metallic) material. For instance, both the canopy and frame section can be fabricated from weather-resistant vinyl coated polyester, sewn together to form a single-piece, unitary structure. Alternatively, the frame section can be fabricated from fiberglass, aluminum or plastic (ABS), while the canopy takes on a flexible fabric construction. A hybrid option includes a substantially rigid frame section interconnected with a substantially rigid canopy via a peripherally continuous gusset of flexible material.

Attendant benefits for at least some of the disclosed concepts include providing an expandable cargo compartment cover that selectively increases in height to concomitantly elevate the cargo compartment ceiling and increase the cargo compartment's storage volume. This, in turn, provides increased cargo capacity for taller objects and more voluminous objects. Advantageously, the expanded cover enshrouds stowed objects to ensure protection from the weather and secure retention during transport. At the same time, the cargo compartment cover allows for ready access to the contents of the cargo compartment. Other benefits for at least some of the disclosed concepts include the cargo compartment cover being selectively collapsed, folded and/or removed to accommodate varying storage and transport needs.

Aspects of the present disclosure are directed to expandable compartment cover assemblies for motor vehicles, such as pickup trucks and other cargo transport vehicles. Disclosed, for example, is an expandable cover assembly for a motor vehicle with a vehicle body having a cargo compartment. The expandable cover assembly includes a frame section that is configured to attach to the vehicle body, and to extend across some or all of the cargo compartment. The frame section defines therethrough a central aperture. A canopy is seated within the central aperture, at least partially surrounded by the frame section. A flexible joint attaches the canopy to the frame section such that the canopy can be lowered to a collapsed state, whereat the canopy is a first (flush) height from the compartment floor of the cargo compartment, and raised to an expanded state, whereat the canopy is a second (elevated) height, greater than the first height, from the compartment floor.

Other aspects of the present disclosure are directed to motor vehicles with expandable tonneau cover assemblies. A "motor vehicle," as used herein, may include any relevant vehicle platform, such as passenger vehicles (internal combustion engine (ICE), hybrid, electric, fuel cell, etc.), commercial vehicles, industrial vehicles, military vehicles, buses, all-terrain vehicles (ATV), farm equipment, etc. In one example, a motor vehicle is disclosed that includes a vehicle body with a rear cargo compartment aft of a passenger compartment. The rear cargo compartment may be enclosed, such as for vans, SUVs and box truck applications, or uncovered, such as for pickup truck and flatbed truck applications. The rear cargo compartment includes a cargo bed adjoined along lateral edges thereof by opposing cargo sidewalls.

An expandable tonneau cover assembly extends across and covers the rear cargo bed. The expandable tonneau cover assembly includes a frame section with opposing lateral edges that are releasably attached to the cargo sidewalls. The frame section extends across the cargo bed and has a central aperture. A canopy is seated in and coterminous with the central aperture such that the canopy is partially or completely surrounded by the frame section. A flexible joint extends continuously or substantially continuously around an inner periphery of the central aperture. This flexible joint movably couples the canopy to the frame section. In so doing, the canopy, in cooperation with the flexible joint, can be selectively transitioned between a collapsed state, whereat the canopy is a first height from the cargo bed floor, and an expanded state, whereat the canopy is a second height, greater than the first height, from the cargo bed floor. A mechanical fastener can be provided to rigidly attach some or all of the outer perimeter of the canopy to some or all of the inner periphery of the central aperture of the frame section to thereby secure the canopy in the collapsed state.

According to other aspects of the present disclosure, methods of making and methods of using expandable compartment cover assemblies are presented. Disclosed, for example, is a method of constructing an expandable cover assembly for a motor vehicle. The method includes: forming a frame section that is configured to attach to the vehicle's body and extend across some or all of the vehicle's cargo compartment; positioning a canopy within a central aperture of the frame such that the canopy is at least partially surrounded by the frame section; and, attaching the canopy to the frame section via a flexible joint. The flexible joint allows the canopy to selectively transition between a collapsed state, whereat the canopy is a first height from a compartment floor of the vehicle's cargo compartment, and an expanded state, whereat the canopy is a second height, greater than the first height, from the compartment floor. The method may further include attaching to the frame section a mechanical fastener that is configured to rigidly attach some or all of the outer perimeter of the canopy to some or all of the inner periphery of the central aperture of the frame section to thereby secure the canopy in the collapsed state.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
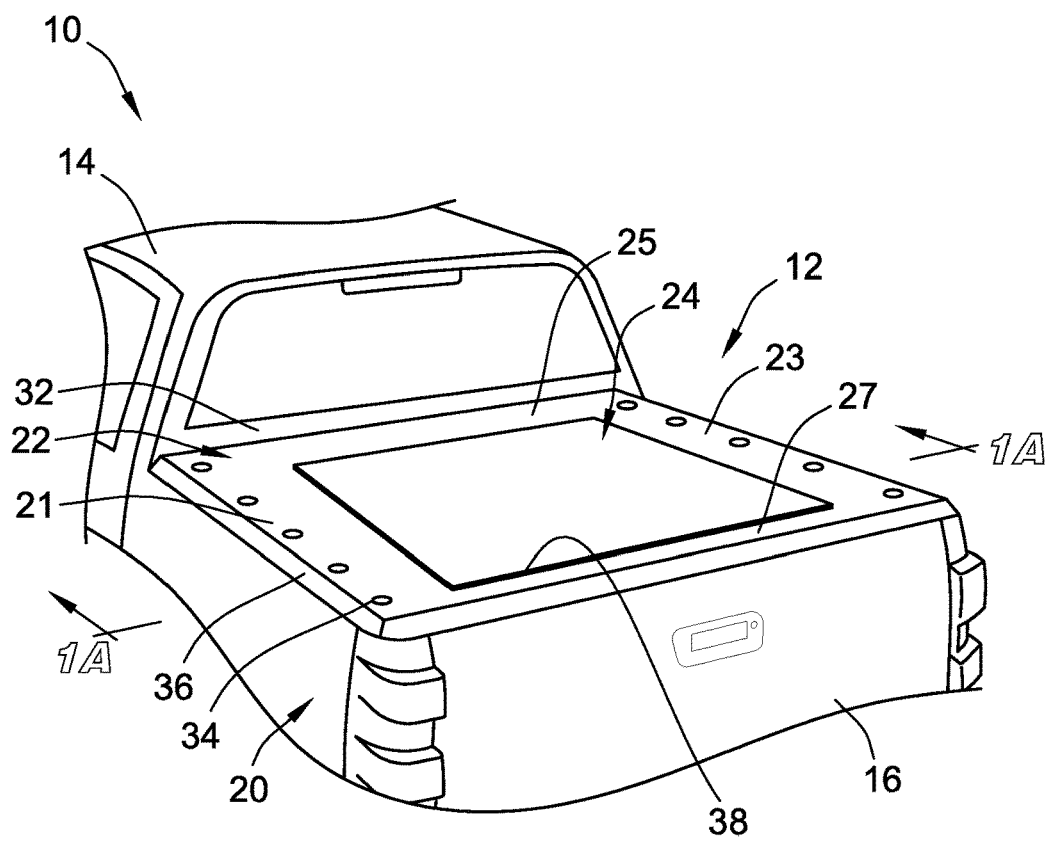
FIG. 1 is an elevated perspective-view illustration of a rear portion of a representative motor vehicle with an expandable cargo compartment cover assembly in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a representative automobile, which is portrayed as a two-door pickup truck and designated generally at 10, and illustrated in accordance with aspects of the present disclosure. Mounted at a rearward portion of the automobile 10, e.g., aft of a passenger compartment 14 and forward of a tailgate 16, is an expandable tonneau cover assembly 12 that extends over a cargo bed 18 (FIG. 1A) of a rear cargo compartment 20. The illustrated automobile 10—also referred to herein as "motor vehicle" or "vehicle" for short—is merely an exemplary application with which the novel aspects of this disclosure can be practiced. In the same vein, the implementation of the present concepts into an open-bed cargo compartment should also be appreciated as an exemplary application of the novel concepts disclosed herein. As such, it will be understood that the aspects and features of the present disclosure can be integrated into other types of vehicle cargo compartments and utilized for any type of motor vehicle. Lastly, the drawings presented herein are not necessarily to scale and are provided purely for instructional purposes. Thus, the specific and relative dimensions shown in the drawings are not to be construed as limiting.

There is shown throughout the Figures a representative expandable tonneau cover 12 (also referred to herein as "expandable cover assembly") that spans the upper extent of the cargo compartment 20 for concealing and protecting the contents thereof. Opposing left and right cargo compartment sidewalls 28 and 30, respectively, adjoin with left and right lateral edges of the cargo bed 18; the tonneau cover 12 is removably connected to and extends between the cargo bed's 18 sidewalls 28 and 30, from a forward endwall 32 to the rear tailgate 16. It should be recognized that the tonneau cover 12 can take on alternative sizes and placements from that which is shown in the drawings depending, for example, on the intended application of the assembly. In one instance, the tonneau cover 12 can be reconfigured as a three-quarter length or a partial-width "toolbox tonneau" that extends across some, but not all, of the cargo compartment 20. According to the illustrated example, the expandable cover assembly 12 is fabricated as a tripartite construction composed of three principal components: a frame section 22, an erectable canopy 24, and a peripherally continuous gusset 26 that functions as a flexible joint for movably connecting the canopy 24 to the frame 22. Alternative configurations, however, may be fabricated from more than three primary segments or constructed as bipartite or single-piece constructions, e.g., where one or more or all of the aforementioned constituent parts are integrally formed as a one-piece component.

To secure the expandable cover assembly 12 to the vehicle 10, opposing lateral sides 21 and 23 of the frame section 22 can be provided with attachment features 34 (e.g., grommet-sealed bolt holes or riveted male snap fasteners) that removably couple to mating structure 36 (e.g., threaded bolt slots or mating female snap fasteners on complementary cover rails) of the cargo bed's 18 lateral sidewalls 28, 30. Optional peripheral hardware, such as weather-tight seal strips, cover rail mounting clamps/brackets, vibration-damping shims, tension-adjusting worm screws, and storage straps, while not shown can certainly be included with the cover assembly 12. Alternative means for securing the expandable cover assembly 12 to the vehicle 10, including manual and automated systems, are within the scope of the present disclosure. This may include pivot hinges, pneumatic cylinders or mounting brackets (not shown) at a forward longitudinal side 25 of the frame section 22 for coupling the cover assembly 12 to the cargo compartment's 20 forward endwall 32, and/or a tailgate bar (not shown) at the frame's 22 a rearward longitudinal side 27 for coupling to the tailgate 18.

Figure 1A:
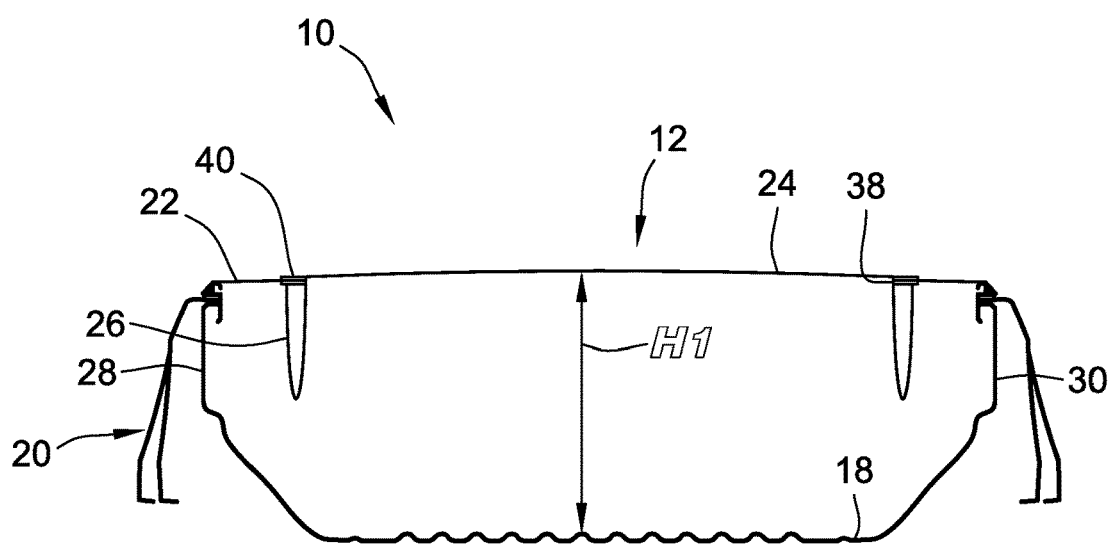
FIG. 1A is a rear-view illustration of the representative motor vehicle of FIG. 1, taken along line 1A-1A to show the expandable cargo compartment cover assembly in a collapsed state.
Figure 2:
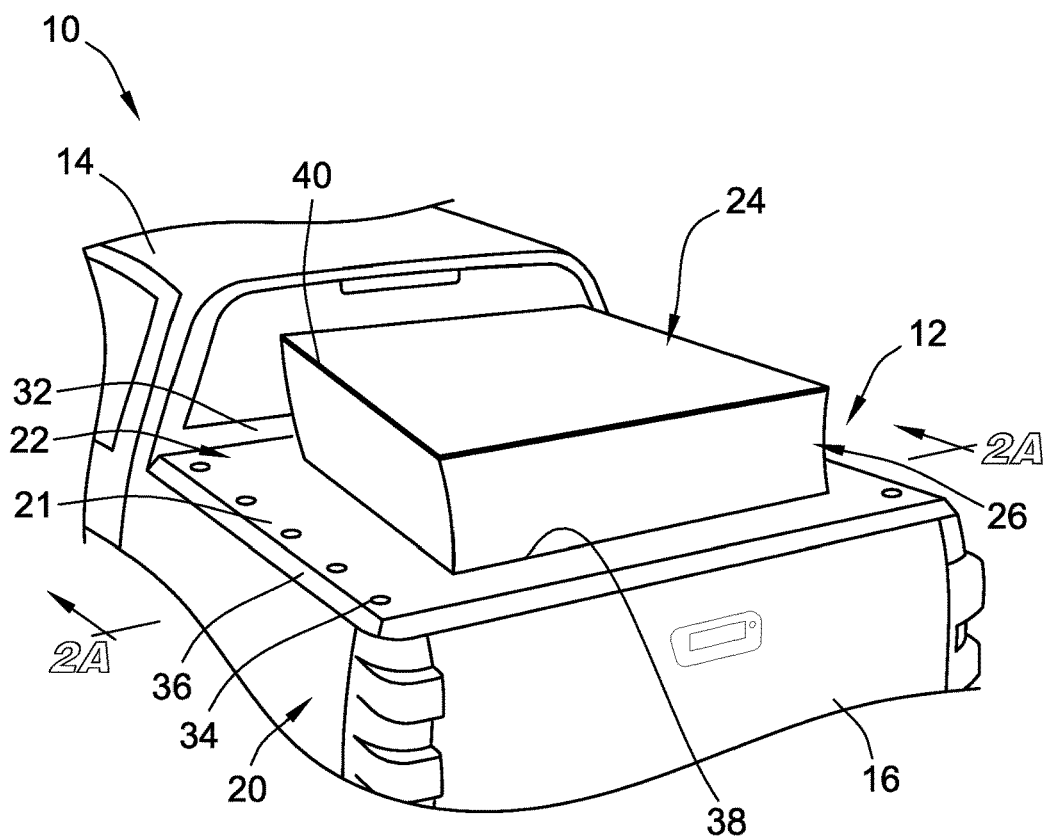
FIG. 2 is another elevated rear perspective-view illustration of the representative motor vehicle of FIG. 1, showing the expandable cargo compartment cover assembly in an expanded state.

In addition to securely attaching the expandable cover assembly 12 to the truck bed, the frame section 22 can also operate to provide functional support for the canopy 24. With collective reference to FIGS. 1 and 1A, the frame's 22 lateral sides 21, 23 are integrally formed with or otherwise attached to the opposing longitudinal sides 25, 27 to define a framework with a central aperture 38 within which is seated the canopy 24. The frame section 22, canopy 24 and central aperture 38 can be fabricated with complementary (square or rectangular) shapes such that the frame section 22 extends continuously around and circumscribes the canopy 24 with the outer perimeter of the canopy 24 coterminous with the inner periphery of the aperture 38. As shown, the frame 22, canopy 24, and aperture 38 all have generally closed polygonal shapes with the central aperture 38 extending through the center of the frame section 22. It is envisioned that the foregoing features of the tonneau cover assembly 12, individually or collectively, can take on any combination of alternative shapes. Moreover, the aperture 38 can be repositioned to any location of the frame section 22, including one or more edges of the frame 22 such that the aperture 38 has a discontinuous perimeter. When the canopy 24 is seated in or above the central aperture 38, the frame section 22 and canopy 24 extend across the entire rear cargo compartment 20, as seen in FIGS. 1 and 2.

Figure 2A:
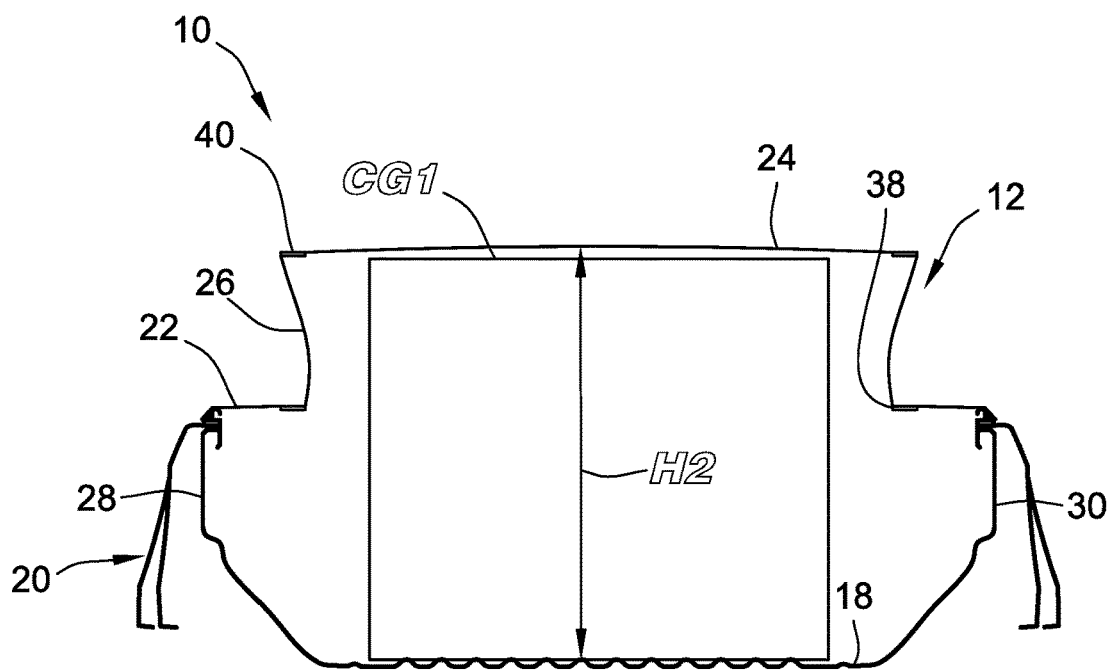
FIG. 2A is another rear-view illustration of the representative motor vehicle of FIG. 1, taken along line 2A-2A of FIG. 2 to show the expandable cargo compartment cover assembly in the expanded state.

A flexible joint, represented herein by a bendable gusset 26, attaches the canopy 24 to the frame section 22 such that the canopy 24 can be raised and lowered to accommodate objects, such as cargo box CG1 of FIG. 2A, of differing shapes, dimensions and volumes. According to the illustrated example, the gusset 26 is fabricated with a square annular shape from a flexible fabric material that extends continuously around the outer perimeter of the canopy 24. Discontinuous designs may comprise a segmented gusset with sections incorporated at only desired locations along the perimeter of the canopy (e.g., along only the lateral or the longitudinal sides). It may be desirable, for at least some embodiments, to construct the frame 22, canopy 24 and gusset 26 from the same material, which may be in the nature of a water resistant/proof, flame retardant, UV reflective, and/or tear-resistant coated polyester or vinyl material. Alternative designs can incorporate a frame and/or canopy that are fabricated from more rigid materials, such as fiberglass, aluminum or plastic (ABS) paneling.

Referring to both FIGS. 1A and 2A, the expandable tonneau cover assembly 12 can be selectively positioned in a collapsed state, which is portrayed in FIG. 1A, and subsequently or thereafter selectively raised to an expanded state, which is illustrated in FIG. 2A. When the assembly 12 is manually or electronically placed in the collapsed state (FIGS. 1 and 1A), the canopy 24 is positioned at a first height H1 from the cargo bed 18 floor of the cargo compartment 20. Conversely, when the assembly 12 is manually or electronically placed in the expanded state (FIGS. 2 and 2A), the canopy 24 is positioned at a second height H2 from the cargo bed 18 floor, which is higher than the first height H1. Collapsing the tonneau cover assembly 12 places the uppermost (canopy) surface of the canopy 24 generally parallel to and substantially flush with the uppermost (frame) surface of the frame section 22, as seen in FIG. 1A. Concomitantly, the flexible gusset 26 is lowered, e.g., in a telescoping manner, into the interior storage volume of the cargo compartment 20. To secure the canopy 24 in the collapsed state, a mechanical fastener 40, which may be in the nature of a zipper or a hook-and-loop flap, rigidly attaches the outer perimeter of the canopy 24 to the inner periphery of the frame's 22 central aperture 38. While the mechanical fastener 40 is shown extending continuously around the outer perimeter of the canopy 24 in the illustrated example, alternative variations may comprise a fastener or fasteners located at only select locations of the frame 22 and canopy 24. On the other hand, expanding the tonneau cover 12 places the uppermost (canopy) surface of the canopy 24 above the uppermost (frame) surface of the frame section 22, as seen in FIG. 2A. At the same time, the flexible gusset 26 is raised out of the interior storage volume of the cargo compartment 20 and contemporaneously surrounds the object CG1. Optionally, an internally packaged articulating skeletal armature or a removable scaffolding/stanchion arrangement can be inserted underneath the canopy 24 to retain the assembly 12 in the raised position.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. An expandable cover assembly for a motor vehicle with a vehicle body including a cargo compartment, the expandable cover assembly comprising:
    a frame section configured to attach to the vehicle body and extend across some or all of the cargo compartment, the frame section defining a central aperture;
    a canopy configured to cover the central aperture and seat against or within the frame section; and
    a flexible joint attaching the canopy to the frame section such that the canopy can selectively transition between a collapsed state, whereat the canopy is a first height from a compartment floor of the cargo compartment, and an expanded state, whereat the canopy is a second height, greater than the first height, from the compartment floor,
    wherein the frame section, the canopy, and the flexible joint are fabricated from one or more flexible materials, and
    wherein an uppermost canopy surface of the canopy is substantially flush with an uppermost frame surface of the frame section when the canopy is in the collapsed state.

2. The expandable cover assembly of claim 1, wherein the frame section and canopy are configured to extend across and cover the cargo compartment when in the collapsed and expanded states.

3. The expandable cover assembly of claim 1, wherein the frame section includes opposing lateral sides interconnected with opposing longitudinal sides such that the frame section extends continuously around the canopy when the canopy is in the collapsed state and seated within the central aperture.

4. The expandable cover assembly of claim 1, wherein the central aperture extends through a center of the frame section.

5. The expandable cover assembly of claim 1, wherein the cargo compartment includes a cargo bed and opposing lateral sidewalls, and wherein the frame section includes opposing lateral sides with attachment features configured to removably couple to the lateral sidewalls of the cargo compartment.

6. The expandable cover assembly of claim 1, wherein the flexible joint extends continuously or substantially continuously along the outer perimeter of the canopy.

7. The expandable cover assembly of claim 6, wherein the flexible joint includes a peripherally continuous flexible gusset.

8. The expandable cover assembly of claim 7, wherein the cargo compartment defines an interior storage volume, and wherein the flexible gusset is positioned within the interior storage volume of the cargo compartment when the canopy is in the collapsed state.

9. The expandable cover assembly of claim 1, wherein the uppermost canopy surface of the canopy is substantially parallel to the uppermost frame surface of the frame section when the canopy is in the collapsed and expanded states.

10. The expandable cover assembly of claim 1, further comprising a mechanical fastener configured to rigidly attach an outer perimeter of the canopy to an inner periphery of the central aperture of the frame section to thereby secure the canopy in the collapsed state.

11. The expandable cover assembly of claim 10, wherein the mechanical fastener extends continuously or substantially continuously around the outer perimeter of the canopy.

12. The expandable cover assembly of claim 10, wherein the mechanical fastener includes a zipper and/or a hook-and-loop flap.

13. The expandable cover assembly of claim 1, wherein the frame section, the canopy, and the flexible joint are interconnected to form a single-piece, unitary structure.

14. A motor vehicle, comprising:
    a vehicle body with a rear cargo compartment aft of a passenger compartment, the rear cargo compartment including a cargo bed adjoined along lateral edges thereof by opposing cargo sidewalls; and
    an expandable tonneau cover assembly extending across and covering some or all of the rear cargo compartment, the expandable tonneau cover assembly comprising:
        a frame section with opposing lateral edges releasably attached to the cargo sidewalls, the frame section extending across the cargo bed and defining a central aperture;
        a canopy configured to cover the central aperture and seat against or within the frame section; and
        a flexible joint extending continuously or substantially continuously around an inner periphery of the central aperture and movably coupling the canopy to the frame section,
    wherein the canopy, in cooperation with the flexible joint, selectively transitions between a collapsed state, whereat the canopy is a first height from a compartment floor of the cargo bed and an uppermost canopy surface of the canopy is substantially flush with an uppermost frame surface of the frame section, and an expanded state, whereat the canopy is a second height, greater than the first height, from the compartment floor and the uppermost canopy surface is displaced from the uppermost frame surface, and
    wherein the frame section, the canopy, and the flexible joint are fabricated from one or more flexible materials.

15. A method of constructing an expandable cover assembly for a motor vehicle with a vehicle body including a cargo compartment, the method comprising:
    forming a frame section configured to attach to the vehicle body and extend across some or all of the cargo compartment, the frame section defining a central aperture;
    positioning a canopy within or across the central aperture such that the canopy is seated against or at least partially surrounded by the frame section; and
    attaching the canopy to the frame section via a flexible joint such that the canopy can selectively transition between a collapsed state, whereat the canopy is a first height from a compartment floor of the cargo compartment, and an expanded state, whereat the canopy is a second height, greater than the first height, from the compartment floor, wherein the frame section, the canopy, and the flexible joint are fabricated from one or more flexible materials, and wherein an uppermost canopy surface of the canopy is substantially flush with an uppermost frame surface of the frame section when the canopy is in the collapsed state.

16. The method of claim 15, wherein the frame section and canopy are configured to extend across and cover the cargo compartment when in the collapsed and expanded states.

17. The method of claim 15, wherein the frame section includes opposing lateral sides interconnected with opposing longitudinal sides such that the frame section extends continuously around the canopy when the canopy is in the collapsed state and seated within the central aperture.

18. The method of claim 15, wherein the flexible joint extends continuously or substantially continuously around the outer perimeter of the canopy.

19. The method of claim 18, wherein the flexible joint includes a peripherally continuous flexible gusset.

20. The method of claim 15, further comprising attaching to the frame section a mechanical fastener configured to rigidly attach an outer perimeter of the canopy to an inner periphery of the central aperture of the frame section to thereby secure the canopy in the collapsed state.

\* \* \* \* \*